(12) United States Patent
Ohbayashi et al.

(10) Patent No.: US 6,723,020 B2
(45) Date of Patent: Apr. 20, 2004

(54) PLANETARY CARRIER AND METHOD OF MANUFACTURE

(75) Inventors: Kouji Ohbayashi, Anjo (JP); Kazunari Suzuki, Anjo (JP); Yoshihisa Yamamoto, Anjo (JP); Kengo Nomura, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/152,355

(22) Filed: May 22, 2002

(65) Prior Publication Data
US 2002/0179205 A1 Dec. 5, 2002

(30) Foreign Application Priority Data
May 30, 2001 (JP) ........................ 2001-162549

(51) Int. Cl.[7] ............... F16H 57/08; C21D 1/04
(52) U.S. Cl. ...................... 475/348; 148/571
(58) Field of Search ................ 475/348; 148/570, 148/571, 573

(56) References Cited

U.S. PATENT DOCUMENTS

| | | | | | |
|---|---|---|---|---|---|
| 4,228,210 A | * | 10/1980 | Scribner | ............... | 29/149.5 X |
| 4,401,485 A | * | 8/1983 | Novorsky | ............... | 148/571 |
| 4,844,752 A | * | 7/1989 | Bear | ............... | 148/571 |
| 6,554,730 B1 | * | 4/2003 | Sakai et al. | ............... | 475/195 |

FOREIGN PATENT DOCUMENTS

| | | | | |
|---|---|---|---|---|
| JP | 58037117 | * | 3/1983 | |
| JP | 06073456 | * | 3/1994 | ............... 148/573 |

* cited by examiner

Primary Examiner—Roger Pang
(74) Attorney, Agent, or Firm—Lorusso, Loud & Kelly

(57) ABSTRACT

A planetary carrier supports pinion gears of a planetary gear set via pinion shafts. Each hole in which a pinion shaft is mounted has a shallow hardened wall surface that is hardened by very-high-frequency induction heating and quenching. Therefore, the durability of the pinion shaft-supporting holes of a cold-forged piece or a pressed piece can be improved without thermal strain.

10 Claims, 4 Drawing Sheets

PLANETARY CARRIER AND METHOD OF MANUFACTURE

INCORPORATION BY REFERENCE

The disclosure of Japanese Patent Application No. 2001-162549 filed on May 30, 2001, including the specification, drawings and abstract, is incorporated herein by reference in its entirety.

BACKGROUND OF THE INVENTION

1. Field of the Invention

The invention relates to a planetary gear set for use in various power transmission apparatuses such as automatic transmissions and the like. More particularly, the invention relates to a structure of a carrier that supports pinion gears of the planetary gear set and to a method of manufacture of the carrier.

2. Description of the Related Art

A planetary carrier in a planetary gear set is an element that transfers rotation of pinion gears that rotate meshes with a sun gear and a ring gear, as is well known. The pinion gears are rotatably supported on the planetary carrier by pinion shafts that are fixed on the planetary carrier via bushes or the like. Pinion shaft-supporting portions of the planetary carrier undergo torsional deformation caused by loads associated with the power transfer via the pinion gears, so that friction occurs due to minor sliding between peripheral surfaces of the shafts and the wall surfaces of holes in which the shafts are supported. To attain good durability and to withstand the aforementioned friction, planetary carriers are conventionally produced by machining hot-forged workpieces although the hot-forged pieces have higher hardness and therefore are more difficult to work than cold-forged workpieces and pressed workpieces. Moreover, the use of a hot-forged workpiece as a material of a planetary carrier leads to a considerably higher production cost due to low productivity and poor stock utilization in machining.

However, other problems are posed by fabrication of a planetary carrier from a cold-forged workpiece that offers good workability and good stock utilization, or from a pressed workpiece that provides higher productivity and, more specifically, by the quench-hardening of only the shaft-supporting portions of such workpieces that require abrasion resistance. Because, the thermal treatment is performed after finishing of the shaft-supporting portions, which normally involves boring followed by reaming, due to requirements for high positional precision and parallelism, a conventional quenching process with a conventional heating depth causes considerable thermal strain in the shaft-supporting portions. This problem is particularly acute in the case of pressed workpieces due to their high susceptibility to thermal strain.

SUMMARY OF THE INVENTION

Accordingly, it is an object of the invention to improve the durability of support portions of a planetary carrier that support pinion gears of a planetary gear via pinion shafts by adopting a quenching process that has a reduced thermal effect.

Another object of the invention is to further reduce the thermal affect of quenching on the support portions by providing a directional quenching.

The aforementioned objects are achieved by the present invention which provides a planetary carrier which supports pinion gears of a planetary gear set via pinion shafts and which has, in a pinion shaft-supporting portion, a shallow hardened surface portion produced by induction quenching and a method of manufacture of same.

Accordingly, the present invention provides a planetary carrier for supporting a pinion gear of a planetary gear set via a pinion shaft and has a support portion which supports the pinion shaft, the support portion having a shallow hardened surface produced by localized induction heating and quenching. In the preferred embodiment described below, the support portion includes a shaft hole into which the pinion shaft is fitted and the hardened surface is at least a portion of a peripheral wall surface defining the shaft hole.

The present invention further provides a method of quench hardening a support portion of a carrier for a planetary gear set wherein the support portion has a hole which receives a pinion shaft. The method includes inserting an induction coil into the hole and supplying high frequency current to the induction coil to inductively heat a peripheral wall surface surrounding the hole. Heating with a high frequency current to the induction coil of at least 400 KHz allows for subsequent quenching of the heated wall surface to produce a uniquely shallow hardened surface portion surrounding the hole. In one embodiment, the heating is performed with the support portion and the induction coil immersed in water. In another preferred aspect of the method of the present invention the induction coil is arc-shaped with an insulated slit and wherein a portion of the peripheral wall surface defining the hole, which is most remote from the insulated slit, is preferentially heated and hardened. The method may further include the pressing of a steel plate to form a carrier portion and the drilling and reaming of the pinion shaft receiving holes in the pressed plate.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
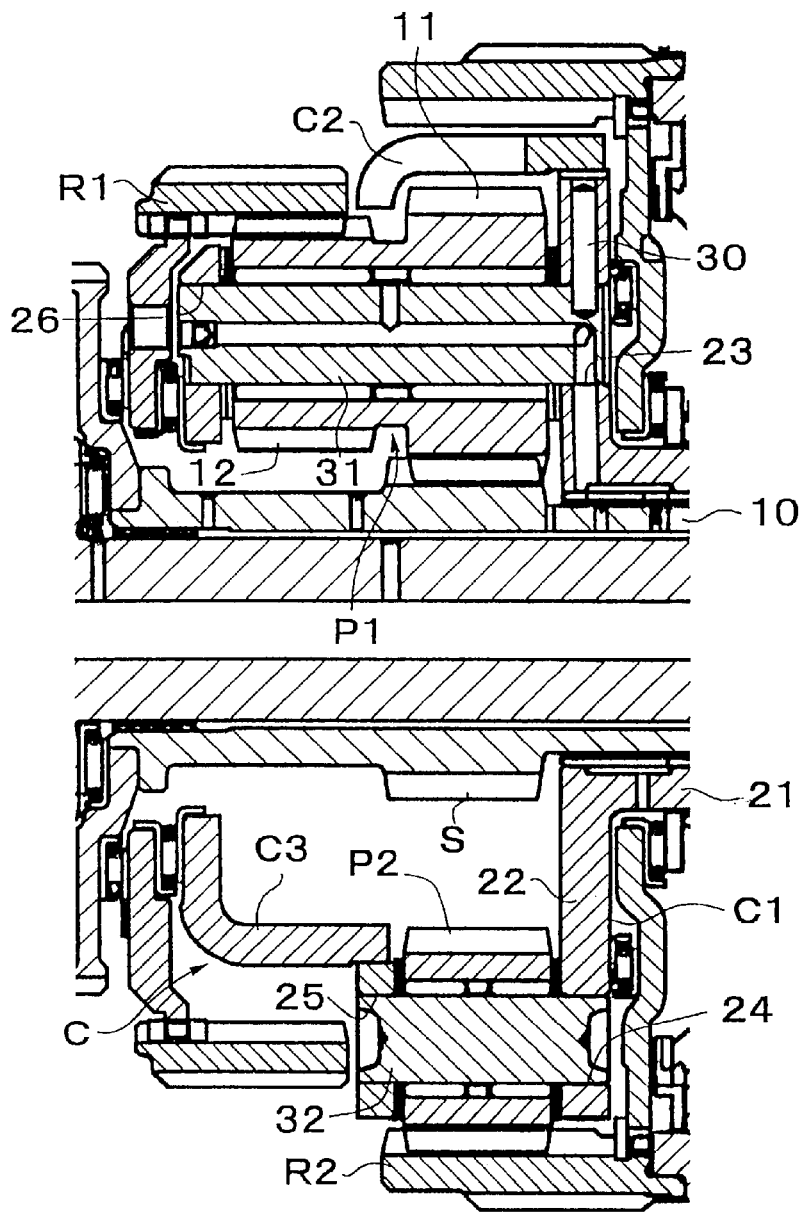
FIG. 1 is an axial sectional view of a planetary gear set in accordance with an embodiment of the invention.

Preferred embodiments of the invention will be described with reference to the accompanying drawings. FIG. 1 shows a planetary gear set to which the invention is applied, incorporated into an automatic transmission. The planetary gear set of this embodiment is a four-element planetary gear set formed by a sun gear S, a set of stepped pinions P1 (four of such pinions are arranged around the circumference), each pinion P1 having a large-diameter gear 11 meshed with the sun gear S and a small-diameter gear 12 meshed with ring gear R1, a set of short pinion gears P2 (again, four of such pinions are arranged circumferentially, although only one is shown) meshed with the large-diameter gears 11 of the stepped pinions P1, a large-diameter ring gear R2 meshed with the short pinion gears P2, and a common planetary carrier C that supports the two sets of pinions P1 and P2. In this embodiment, outer peripheral surfaces of the small-diameter ring gear R1 and the large-diameter ring gear R2 have splines for engaging and supporting friction members of multi-disc clutches (not shown), and thereby serve as the hubs of the multi-disc clutches.

In the planetary gear set of this embodiment, the planetary carrier C is formed by a front carrier C1 having an axially extending cylindrical boss 21 and a flange 22 that extends radially from one end of the cylindrical boss 21. The carrier C further includes a cup-shaped carrier cover C2 which is connected at its interior surface to the outer periphery of the flange portion 22 of the front carrier C1, and a cup-shaped rear carrier C3 which is connected to an inner periphery of the carrier cover C2. The flange portion 22 of the front carrier C1 has shaft holes 23, 24 (support portions) into which first end portions of pinion shafts 31, 32 of the stepped pinions P1 and the short pinion gears P2 are fitted. The carrier cover C2 has shaft holes 25 (support portions) into which second end portions of the pinion shafts 32 of the short pinion gears P2 are fitted. The cup-shaped rear carrier C3 has shaft holes 26 (support portions) into which second end portions of the pinion shafts 31 of the stepped pinions P1 are fitted.

The planetary carrier C is supported at the front carrier C1 end (shown on the right in the drawing) on a sun gear shaft 10 that is formed integrally with the sun gear S. The carrier cover C2 is supported by the front carrier C1, and the rear carrier C3 is supported by the front carrier C1 via the carrier cover C2. Therefore, if during power transfer between the small-diameter ring gear R1 and the stepped pinions P1, there occurs such a force as to bend the axis of the small-diameter gear 12 of pinion P1 away from the axis of the large-diameter gear 11 of the stepped pinion P1, in a circumferential direction, and the pinion shafts 31 supporting the stepped pinions P1 deform torsionally around the sun gear shaft 10. The torsional deformation may become large due to the long support span of the pinion shafts 31. Thus, friction abrasion occurs between the peripheral surfaces of the pinion shafts 31 and the peripheral surfaces of the shaft holes 26, and durability is reduced.

Figure 2A:
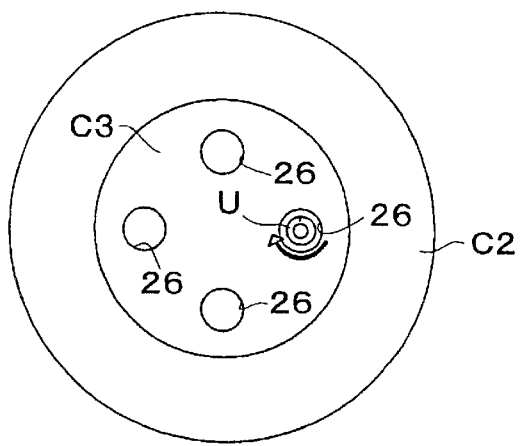
FIGS. 2A and 2B are schematic diagrams illustrating a method of very-high-frequency induction heating in accordance with the present invention.
Figure 2B:
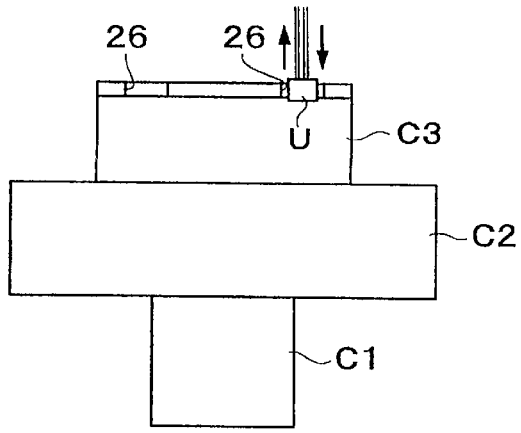

To cope with this frictional abrasion, the present invention forms hardened surfaces by induction heating and quenching of the peripheral surfaces of the shaft holes 26 (support portions) that require abrasion resistance. FIGS. 2A and 2B schematically illustrate a method of induction heating and quenching in accordance with the invention. After the front carrier C1, the carrier cover C2 and the rear carrier C3 are assembled, four shaft holes 26 are machined and their wall surfaces are finished by reaming. The carrier assembly is then oriented with the rear carrier C3 being on top, and an induction heating coil U is inserted in shaft hole 26 with a certain clearance maintained from the peripheral wall surface of the shaft hole 26 as shown in FIG. 2B. After that, ultra high frequency current is caused to flow to the induction heating coil for a very short time. The flow of electric current is indicated by arrows in the drawing. Current flows through the coil U from an end of the coil U through about one complete turn clockwise (in a view of FIG. 2A) along the hole wall, and causes induction currents, that is, eddy currents, at a predetermined depth from the peripheral wall surface of the shaft hole. The relationship between the depth and the induction frequency will be described below. With this induction heating and subsequent quenching the wall surface surrounding hole 26 is quench hardened.

If the application time of induction heating is set at about 0.8 second, the carrier assembly is submerged in water for the purpose of rapid heat dissipation after induction heating. The time of induction heating may be reduced to about 0.2 second with the carrier assembly placed in an atmosphere other than water. It has been found that heat dissipation after induction heating for about 0.2 second is good and sufficient in atmospheres other than water.

Figure 3:
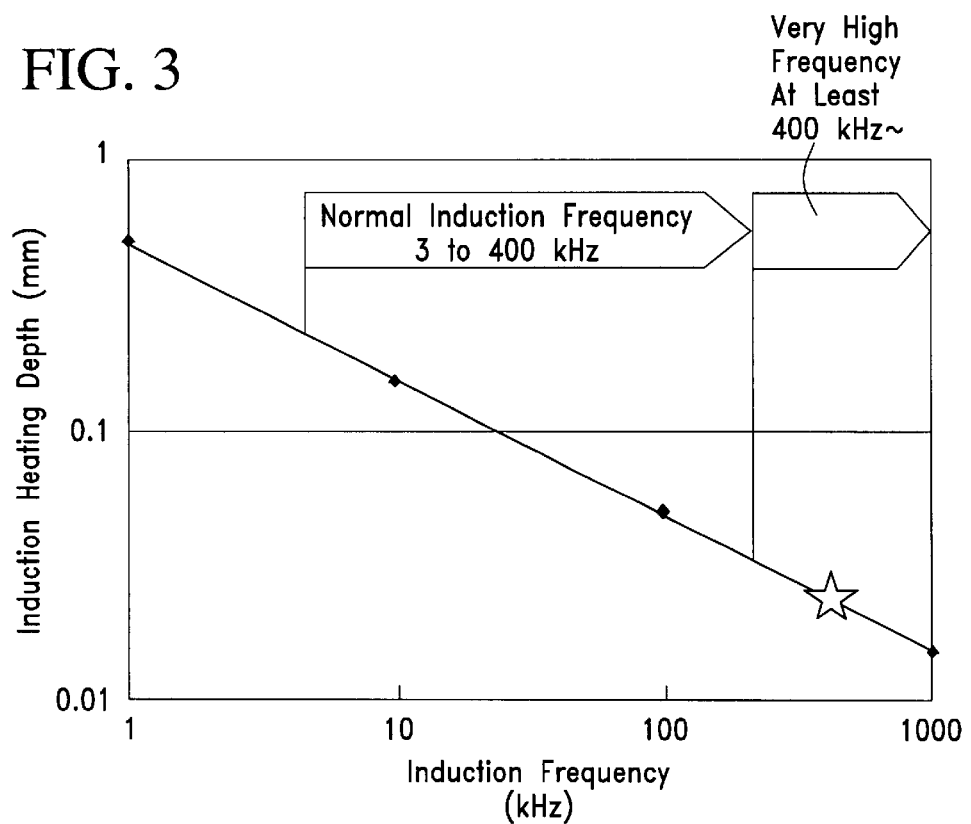
FIG. 3 is a graph of the relationship between the induction frequency and the induction heating depth in the hardening.

FIG. 3 shows the relationship between the induction frequency and the induction heating depth in the above-described induction heating. As indicated in FIG. 3, the induction heating depth achieved by induction frequencies of 3 to 400 kHz, frequencies typically employed in induction heating, is relatively great, for example, about 0.2 mm at 10 kHz, and about 0.05 mm at 100 kHz. In induction heating at a very high frequency of at least 400 kHz in accordance with the invention, the induction heating depth is, for example, about 0.02 mm (indicated by a star-like symbol), that is, the effect of quench hardening is limited to a very shallow surface portion of each shaft hole and, therefore, the thermal strain produced in the planetary carrier by the very-high-frequency induction heating and subsequent quenching is very small in the present invention.

Figure 4:
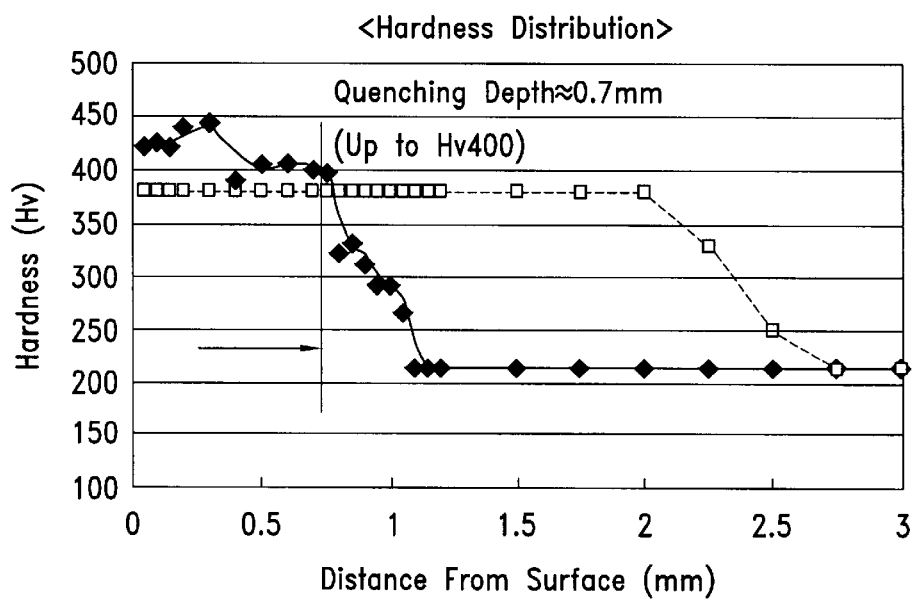
FIG. 4 is a graph of hardness distribution achieved by the very-high-frequency induction heating and quenching in comparison with a hardness distribution achieved by a conventional induction heating and quenching.

FIG. 4 shows a hardness distribution achieved by the very-high-frequency induction heating and quenching in comparison with a hardness distribution achieved by a conventional induction heating/quenching process. As indicated by symbol "□", the conventional induction heating/quenching achieves Vickers hardness (Hv) of about 380 in a region extending about 2 mm below the surface. In contrast, in the very-high-frequency induction heating and quenching of the present invention, as indicated by symbol "♦", a region having a Vickers hardness greater than 400 extends less than 1.0 mm, e.g., about 0.7 mm, below the surface, that is, the region is very shallow. Furthermore, the thermally affected region is reduced to about 1 mm or slightly more below the surface, compared with 2.5 mm in the case of the conventional induction heating and quenching.

The aforementioned arc-shaped quench-hardening coil has a slit for insulation between the two circumferential ends of the coil, that is, the slit interrupts the circumferential continuity of the circular coil. Therefore, if this coil is used to heat a shaft hole, a portion of the hole wall that faces the insulating slit of the coil does not undergo induction heating, and is not hardened as desired. Thus, this type of coil is unable to harden the entire perimeter of a shaft hole. To cope with this drawback, the orientation of induction heating coil is set in accordance with the objectives of the present invention.

Figure 5:
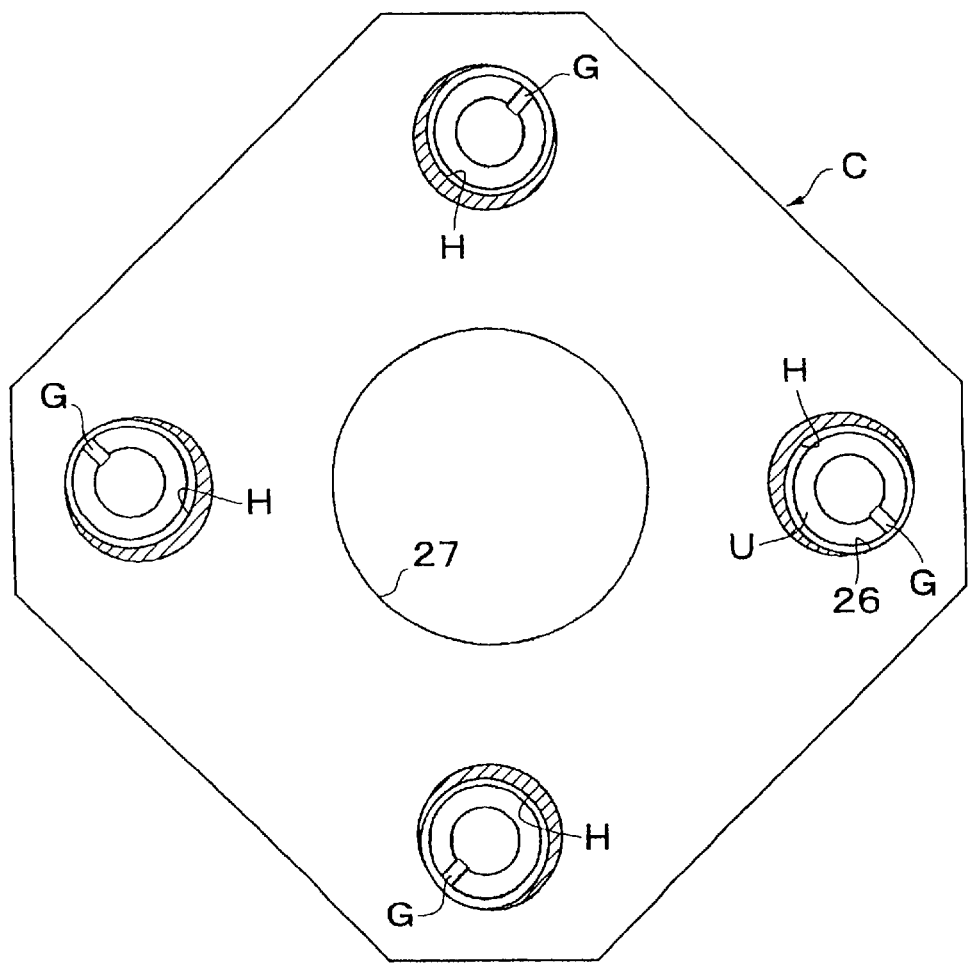
FIG. 5 is a plan view showing positioning of quench-hardening coils relative to a rear carrier in the quench-hardening process.

FIG. 5 shows, in a plan view of the planetary carrier taken from above, the orientations of the induction heating coils within the shaft holes. As can be seen in FIG. 5, each hardening coil U is positioned so that the insulating slit G of the coil is oriented in a specific direction with respect to a center hole 27 through which the sun gear shaft extends. Therefore, a hardened surface H is formed in a portion, indicated by hatching, of the wall of each shaft hole 26 that is remote from the insulating slit G of the arc-shaped hardening coil U. In FIG. 5 the hatching indicates a quench-hardened state in an exaggerated fashion.

If in the planetary gear set of the embodiment shown in FIG. 1, a clutch whose hub-side portion is shown in FIG. 1 is engaged for torque transfer between the small-diameter ring gear R1 and the stepped pinions P1, the load turns the stepped pinions P1 about the sun gear shaft 10. The deformation of the planetary carrier C caused by that load occurs as follows. A front side C1 of the planetary carrier C has a highly rigid structure in which the cylindrical boss portion 21 extends from the radially inner edge of the flange 22 which has the shape of circular disc without a slit or break. In contrast, the cup-shaped carrier cover C2 of the planetary carrier C has an opening that exposes the short pinion gears P2. Similarly, the cup-shaped rear carrier C3 has an opening that exposes the small-diameter gears 12 of the stepped pinions P1. Therefore, the rigidity of the rear side C3 portion of the planetary carrier C is relatively low considering the planetary carrier C as a whole. Therefore, if a load as described above occurs, each stepped pinion P1-supporting pinion shaft 31 inclines about its base, that is prevented from rotating by a pin 30 provided at the front side C1, in a circumferential direction with respect to the sun gear shaft 10 as a center, with torsional deformation of a rear side C3 of the carrier C. Due to the inclination of the pinion shafts 31, sliding occurs between the outer peripheral surfaces of the pinion shafts 31 and the wall surfaces of the shaft holes 26, although the sliding is slight. In this case, the plane of sliding conforms to the direction of the load.

The direction of the load in the case of the planetary carrier C of this embodiment is about 45° inward from a tangential line on a circle that passes through the centers of the shaft holes 26 in FIG. 5. Therefore, the quench-hardening is directed in conformance with the direction of the load, so that the hardened surfaces H can be formed as desired by the circular heating coils. This also means that it is possible to limit or localize the hardened region with regard to both circumferential position and depth.

As is apparent from the foregoing description, the above-described embodiment provides improvement in the abrasion resistance of the shaft support holes while reducing the deformation caused by thermal strain, due to the shallow induction heating and quenching. Therefore, it becomes possible to produce a planetary carrier from a pressed mild-steel piece that has good workability. Furthermore, among the support portions 23, 26 for supporting the pinion shafts 31 at the first and second-side end portions thereof, only the support portions 26, that is, only the support portions that need to have abrasion resistance are quench-hardened. Thus, the support portions to be quench-hardened are limited to a minimum number of sites, so that durability can be improved efficiently within a small number of man-hours.

Furthermore, the regions that are thermally affected by quench-hardening can be limited to only a portion of the peripheral surface of each of the shaft holes 26, which form support portions. Therefore, it is possible to substantially eliminate the effect of thermal strain on the positional precision and parallelism of the shaft holes 26. From another point of view, the drawback that an arc-shaped hardening coil U used in induction heating is unable to achieve 360° of hardening due to the fact that a portion of the wall surface adjacent the insulating slit G of the coil U is not hardened, is utilized to advantage by the appropriate hardening of only a necessary region of the peripheral surface of the shaft hole 26, that is, the region in the direction of the aforementioned load.

Still further, the very-high-frequency induction heating can considerably reduce the depth of the hardened surface portion. Therefore, the thermal effect can be localized, and occurrence of strain can be further reduced or prevented. As a result, it becomes possible to produce a planetary carrier C with very high productivity. Furthermore, it is possible to maintain high positional precision and high parallelism of the shaft holes 26 in a pressed steel piece that is susceptible to thermal strain.

While the invention has been described with reference to an embodiment in which the invention is applied to a specific planetary carrier, it is to be understood that the described embodiment is merely illustrative and that the invention is applicable to a wider variety of planetary carriers. That is, the invention is intended to cover various modifications and equivalent arrangements. In addition, while the various elements of the disclosed invention are shown in various combinations and configurations, which are exemplary, other combinations and configurations are also considered to be within the spirit and scope of the invention.

What is claimed is:

1. A method of quench hardening a support portion of a carrier for a planetary gear set wherein the support portion has a hole which receives a pinion shaft, said method comprising:

inserting an induction coil into the hole;

supplying high frequency current to the induction coil to inductively heat a peripheral wall surface surrounding the hole;

quenching the heated wall surface for quench-hardening; and wherein the induction coil is arc-shaped with an insulated slit, and wherein a portion of the peripheral wall surface most remote from the insulated slit is preferentially heated and hardened.

2. The method of claim 1 wherein said heating is performed with the support portion and the induction coil immersed in water.

3. The method of claim 1 wherein the frequency of the current is at least 400 kHz.

4. The method of claim 3 wherein the support portion is inductively heated to a depth of no greater than 0.03 mm from the peripheral wall surface.

5. The method of claim 1, wherein the hardened surface portion is formed with the quenching coil disposed so that the portion most remote from the insulated slit of the arc-shaped quenching coil substantially conforms to a direction of loading.

6. A method of manufacture of a carrier for a planetary gear set comprising:

pressing a steel plate to form a carrier portion;

drilling holes in the carrier portion;

reaming the drilled holes;

inserting an induction coil into at least one of the reamed holes;

supplying a high frequency current to the induction coil to inductively heat at least a portion of a peripheral wall surface surrounding the one hole;

quenching the heated wall surface for quench-hardening; and wherein the induction coil is arc-shaped with an insulated slit, and wherein a portion of the peripheral wall surface most remote from the insulated slit is preferentially heated and hardened.

7. The method of claim 6, wherein the frequency of the current is at least 400 kHz.

8. The method of claim 6, wherein the hardened surface portion is formed with the quenching coil disposed so that the portion most remote from the insulated slit of the arc-shaped quenching coil substantially conforms to a direction of loading.

9. The planetary carrier according to claim 6 wherein the wall surface is quench-hardened to a depth of no more than 1 mm.

10. A planetary carrier for supporting a pinion gear of a planetary gear set via a pinion shaft, comprising:
   a support portion including a shaft hole;
   wherein said pinion shaft is fitted within the shaft hole; and
   wherein a shallow hardened surface portion extends around at least a portion of a peripheral wall surface defining the shaft hole and is formed by a method comprising:
   inserting an induction coil into the shaft hole;
   supplying high frequency current to the induction coil to inductively heat the peripheral wall surface surrounding the hole;
   quenching the heated wall surface for quench-hardening; and
   wherein the induction coil is arc-shaped with an insulated slit, and wherein a portion of the peripheral wall surface most remote from the insulated slit is preferentially heated and hardened.

* * * * *